(12) United States Patent
Kuligowski (10) Patent No.: US 10,421,086 B1
(45) Date of Patent: Sep. 24, 2019

(54) REUSABLE DRY ERASE SPRAY PAINT CAN

(71) Applicant: Christine Kuligowski, Falls Church, VA (US)

(72) Inventor: Christine Kuligowski, Falls Church, VA (US)

( * ) Notice: Subject to any disclaimer, the term of this patent is extended or adjusted under 35 U.S.C. 154(b) by 0 days.

(21) Appl. No.: 16/011,701

(22) Filed: Jun. 19, 2018

(51) Int. Cl.
*B05B 7/24* (2006.01)
*B05B 15/00* (2018.01)

(52) U.S. Cl.
CPC ............. *B05B 7/24* (2013.01); *B05B 15/00* (2013.01)

(58) Field of Classification Search
CPC ........ B05B 7/24; B05B 15/00; B05B 11/0054
USPC ....................................... 222/401
See application file for complete search history.

(56) References Cited

U.S. PATENT DOCUMENTS

| | | | | |
|---|---|---|---|---|
| 2,766,072 A | * | 10/1956 | Commarato | B65D 83/384 222/173 |
| 3,211,343 A | | 10/1965 | Silver | |
| 3,236,418 A | * | 2/1966 | Dalle | B65D 83/682 222/131 |
| 3,669,313 A | * | 6/1972 | Marand | B65D 83/60 222/635 |
| 3,731,854 A | * | 5/1973 | Casey | B65D 83/62 222/386.5 |
| 3,955,720 A | * | 5/1976 | Malone | B05B 7/0037 222/396 |
| 3,995,779 A | * | 12/1976 | Mizzi | B05B 9/0822 222/401 |
| 3,998,361 A | * | 12/1976 | Arena | B05B 9/0822 222/182 |
| 4,018,361 A | * | 4/1977 | Fegley | B65D 83/267 109/33 |
| 4,089,443 A | * | 5/1978 | Zrinyi | B65D 83/62 222/386.5 |
| 4,135,647 A | * | 1/1979 | Mascia | F04B 43/1253 222/211 |
| 4,147,284 A | * | 4/1979 | Mizzi | B05B 9/0822 222/401 |
| 4,154,375 A | * | 5/1979 | Bippus | H01H 3/0206 200/61.86 |
| 4,165,025 A | * | 8/1979 | Mascia | B05B 9/0822 222/401 |
| 4,222,525 A | * | 9/1980 | Hildebrandt | B05B 7/2416 222/401 |
| 4,341,330 A | * | 7/1982 | Mascia | B65D 83/14 222/401 |
| 4,793,527 A | * | 12/1988 | Di Stefano | B65D 83/386 222/402.24 |
| 4,972,975 A | * | 11/1990 | Fuhrig | B05B 7/0025 222/182 |

(Continued)

FOREIGN PATENT DOCUMENTS

EP  2153906 A  1/2017

*Primary Examiner* — Benjamin R Shaw (57) ABSTRACT

The reusable dry erase spray paint can is a can having a removable base and a replaceable color cartridge. The can resembles an ordinary spray paint can with a nozzle on top. The base comprises a battery-operated compressor that draws air in through an inlet on the bottom of the can and forces pressurized air up into the can through the color cartridge. The color cartridge couples to the top of the base and contains a dry erase color medium. When the nozzle is depressed while the compressor is operating, a mix of dry erase color medium and pressurized air is expelled from the nozzle.

13 Claims, 5 Drawing Sheets

(56) References Cited

U.S. PATENT DOCUMENTS

| | | | | |
|---|---|---|---|---|
| 5,348,190 A * | 9/1994 | Mizzi | ............ | B05B 9/0816 |
| | | | | 222/325 |
| 5,358,147 A * | 10/1994 | Adams | ............ | B65D 83/386 |
| | | | | 222/183 |
| 5,423,454 A * | 6/1995 | Lippman | ............ | B65D 83/625 |
| | | | | 204/271 |
| 5,460,300 A * | 10/1995 | Tritsch | ............ | B05B 9/0822 |
| | | | | 222/401 |
| D378,572 S | 3/1997 | Culverwell | | |
| 5,623,974 A * | 4/1997 | Losenno | ............ | B05B 9/0805 |
| | | | | 137/511 |
| 5,730,326 A * | 3/1998 | Kaeser | ............ | B65D 83/34 |
| | | | | 222/402.1 |
| 5,746,354 A | 5/1998 | Perkins | | |
| 5,749,502 A * | 5/1998 | Hinds | ............ | B05B 9/0822 |
| | | | | 222/386.5 |
| 5,839,623 A * | 11/1998 | Losenno | ............ | B65D 83/62 |
| | | | | 222/402.1 |
| 5,915,595 A * | 6/1999 | Dow | ............ | B65D 83/62 |
| | | | | 222/105 |
| 6,050,498 A | 4/2000 | Minoura | | |
| 6,119,899 A * | 9/2000 | Iizuka | ............ | B05B 11/3087 |
| | | | | 222/190 |
| 6,607,012 B2 * | 8/2003 | Yquel | ............ | B65B 31/003 |
| | | | | 141/113 |
| 7,000,267 B2 * | 2/2006 | Chesters | ............ | A61H 35/00 |
| | | | | 222/318 |
| 8,453,949 B2 | 6/2013 | Kwan | | |
| 8,584,971 B2 | 11/2013 | Seabase | | |
| 2001/0025857 A1 * | 10/2001 | Baudin | ............ | B65D 83/38 |
| | | | | 222/95 |
| 2003/0108487 A1 * | 6/2003 | Bara | ............ | A45D 34/04 |
| | | | | 424/47 |
| 2004/0173143 A1 * | 9/2004 | King | ............ | A63B 71/0672 |
| | | | | 118/264 |
| 2007/0205218 A1 * | 9/2007 | Mueller | ............ | B05B 11/0081 |
| | | | | 222/129 |
| 2007/0241134 A1 * | 10/2007 | Gurrisi | ............ | B65D 83/384 |
| | | | | 222/153.11 |
| 2008/0105706 A1 * | 5/2008 | Tsai | ............ | B05B 11/0045 |
| | | | | 222/95 |
| 2008/0265060 A1 * | 10/2008 | Canfield | ............ | B05B 7/2416 |
| | | | | 239/373 |
| 2010/0096477 A1 * | 4/2010 | Klein, II | ............ | B05B 12/004 |
| | | | | 239/525 |
| 2012/0104047 A1 * | 5/2012 | Lim | ............ | A61K 9/0014 |
| | | | | 424/43 |
| 2012/0153047 A1 * | 6/2012 | Rose | ............ | B65D 83/425 |
| | | | | 239/308 |
| 2013/0126560 A1 * | 5/2013 | Raffaghello | ............ | B05B 7/2416 |
| | | | | 222/394 |
| 2014/0166781 A1 * | 6/2014 | Johnson | ............ | A61L 9/127 |
| | | | | 239/310 |
| 2014/0209640 A1 * | 7/2014 | Levenstein | ............ | B65D 83/384 |
| | | | | 222/325 |
| 2014/0252127 A1 | 9/2014 | Fedorov | | |
| 2015/0320947 A1 * | 11/2015 | Eicher | ............ | A61M 15/0071 |
| | | | | 128/200.14 |
| 2017/0072147 A1 * | 3/2017 | Eicher | ............ | A61M 15/0065 |

\* cited by examiner

REUSABLE DRY ERASE SPRAY PAINT CAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of artist tools, more specifically, a reusable dry erase spray paint can.

SUMMARY OF INVENTION

The reusable dry erase spray paint can is a can having a removable base and a replaceable color cartridge. The can resembles an ordinary spray paint can with a nozzle on top. The base comprises a battery-operated compressor that draws air in through an inlet on the bottom of the can and forces pressurized air up into the can through the color cartridge. The color cartridge couples to the top of the base and contains a dry erase color medium. When the nozzle is depressed while the compressor is operating, a mix of dry erase color medium and pressurized air is expelled from the nozzle.

An object of the invention is to provide a spray paint can for a dry erase color medium.

Another object of the invention is to provide the dry erase color medium in a replaceable cartridge.

A further object of the invention is to provide a removal base to the can that gives access to the replaceable cartridge.

Yet another object of the invention is to provide a battery-operated compressor within the base to pressurize the dry erase color medium.

These together with additional objects, features and advantages of the reusable dry erase spray paint can will be readily apparent to those of ordinary skill in the art upon reading the following detailed description of the presently preferred, but nonetheless illustrative, embodiments when taken in conjunction with the accompanying drawings.

In this respect, before explaining the current embodiments of the reusable dry erase spray paint can in detail, it is to be understood that the reusable dry erase spray paint can is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reusable dry erase spray paint can.

It is therefore important that the claims be regarded as including such equivalent construction insofar as they do not depart from the spirit and scope of the reusable dry erase spray paint can. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
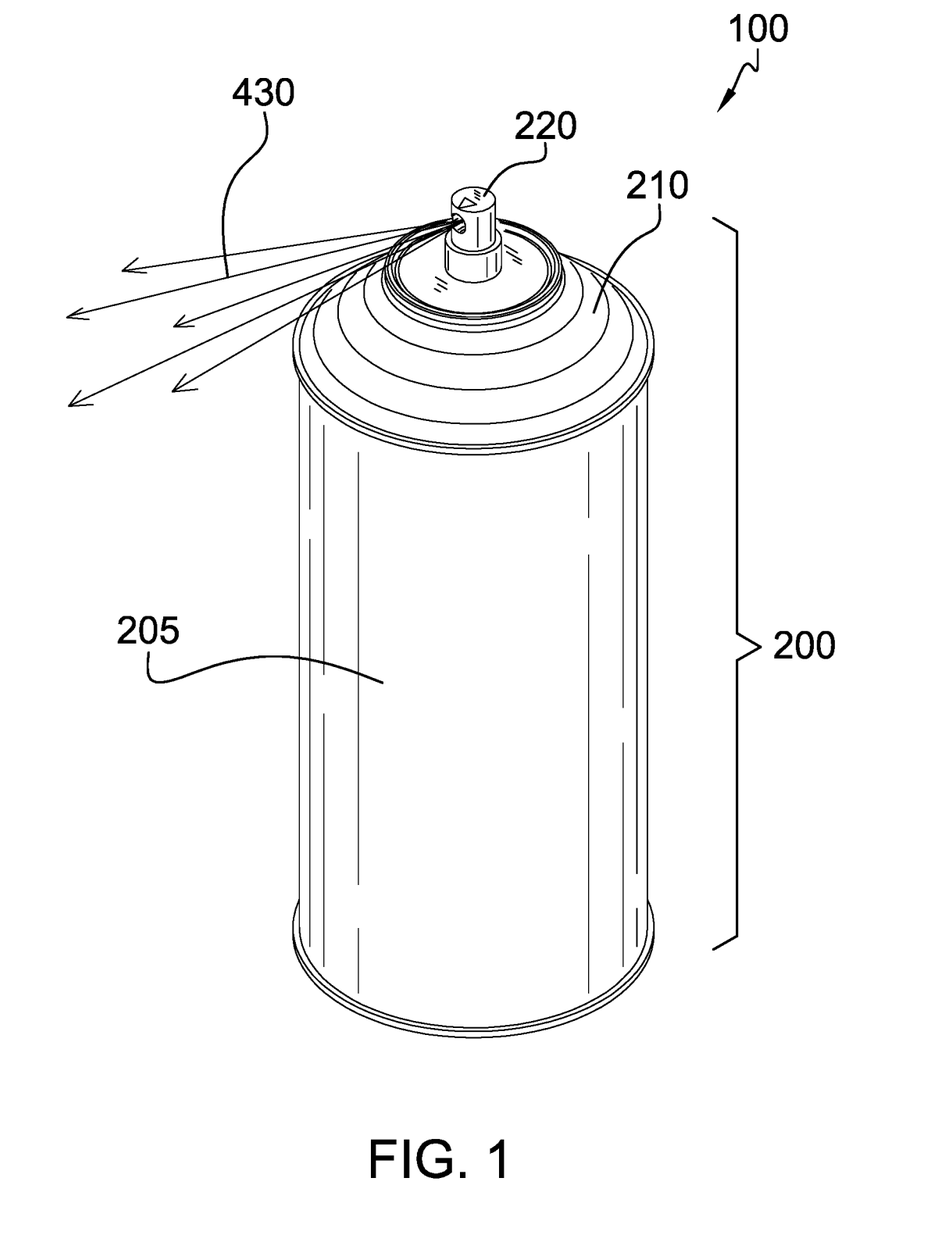
FIG. 1 is a perspective view of an embodiment of the disclosure.
Figure 2:
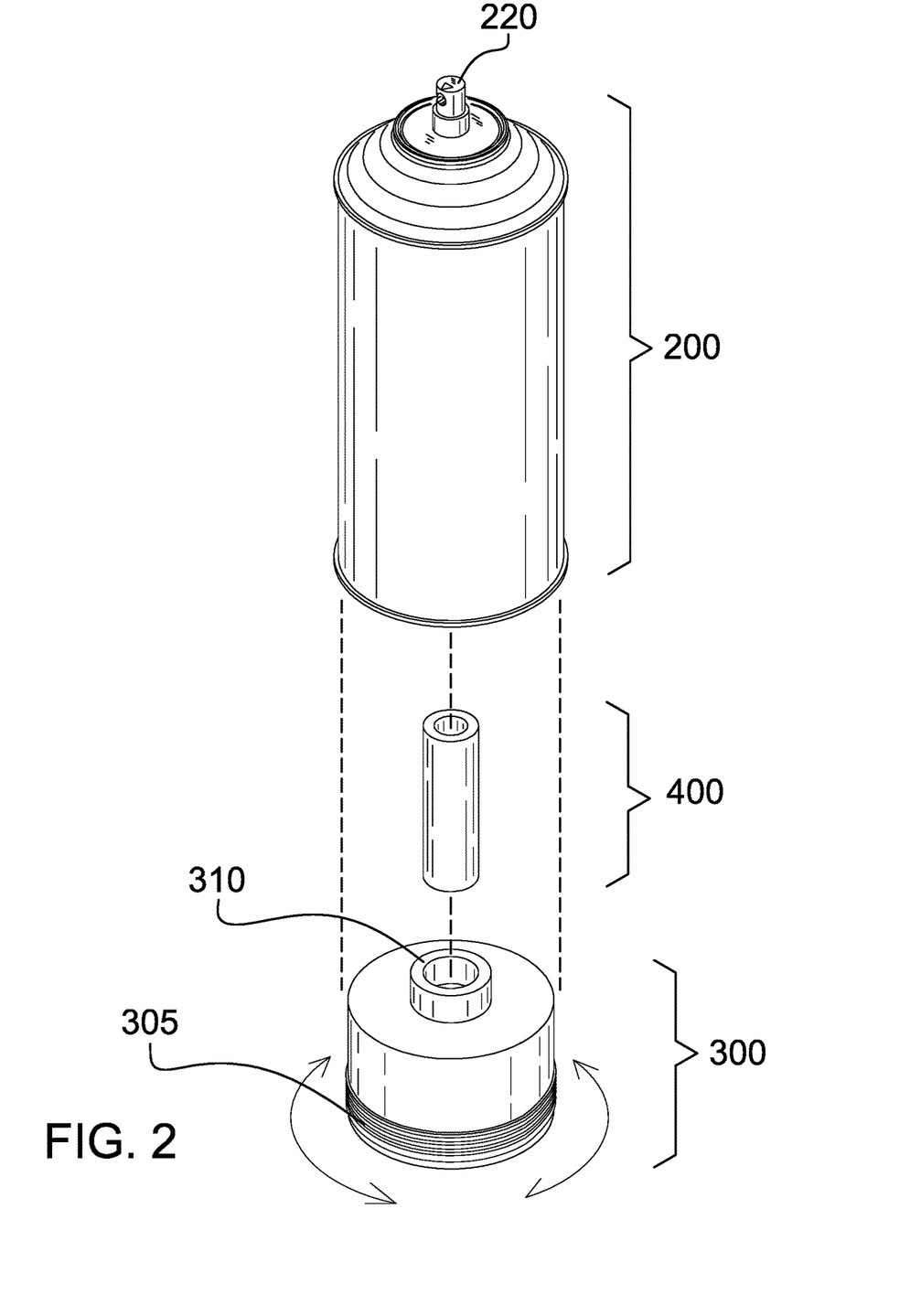
FIG. 2 is an exploded view of an embodiment of the disclosure.
Figure 3:
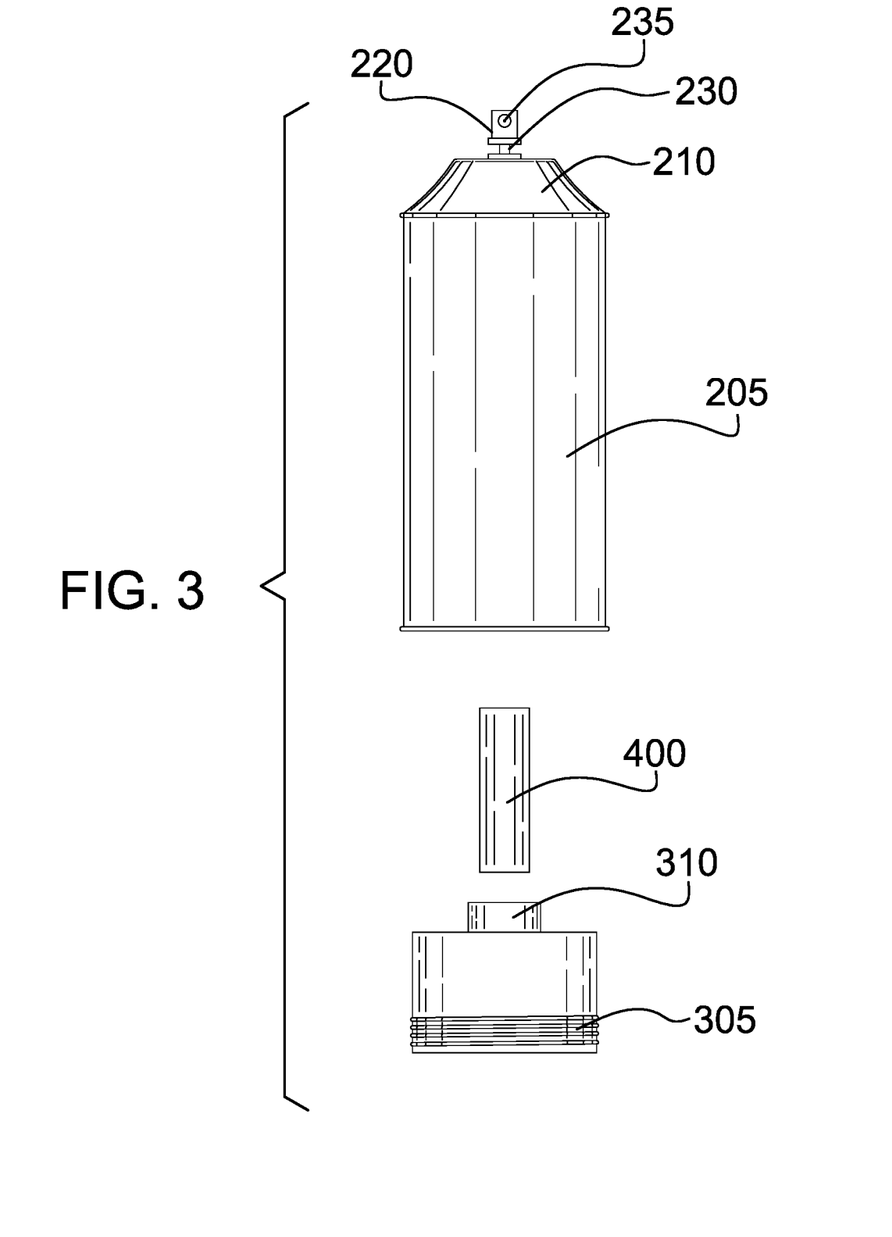
FIG. 3 is a front view of an embodiment of the disclosure.
Figure 4:
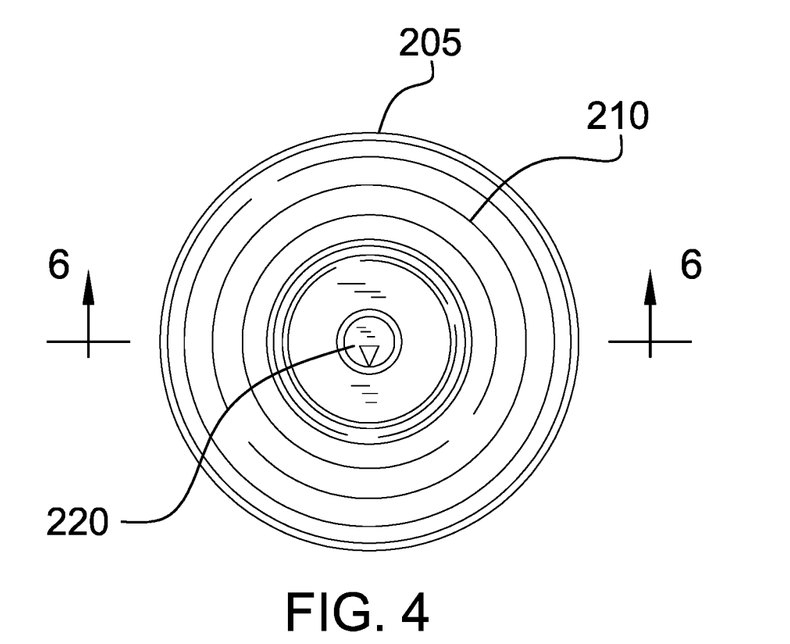
FIG. 4 is a top view of an embodiment of the disclosure.
Figure 5:
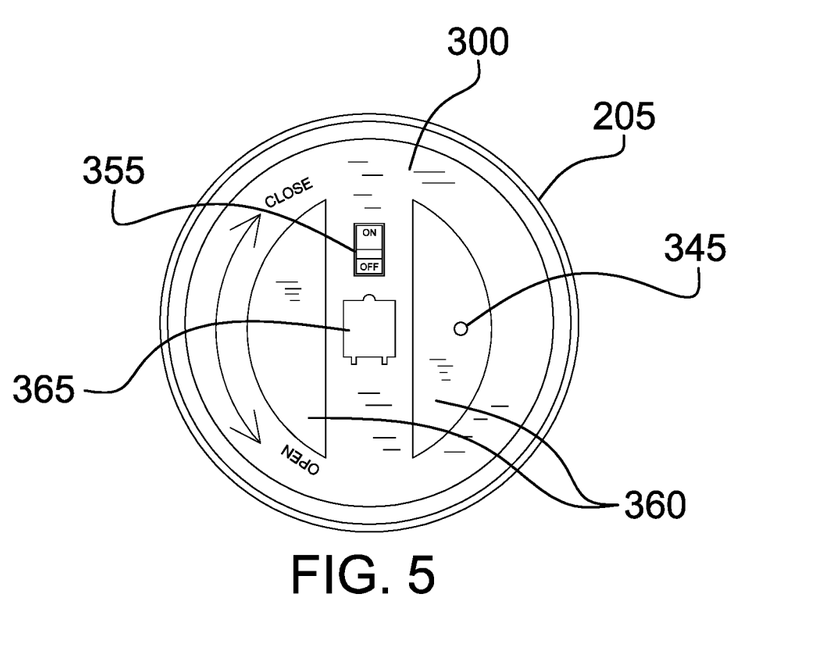
FIG. 5 is a bottom view of an embodiment of the disclosure.
Figure 6:
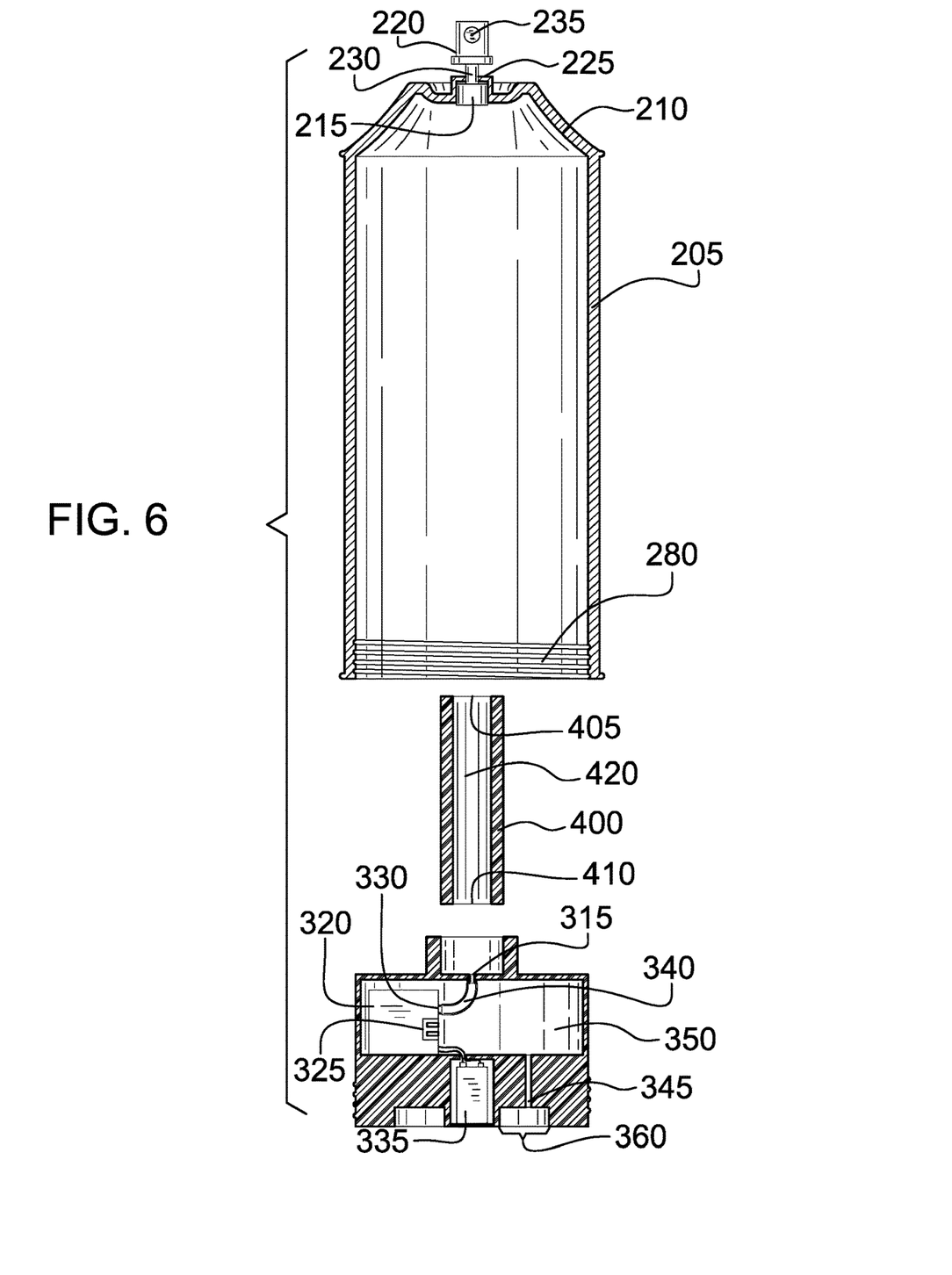
FIG. 6 is a cross-sectional view of an embodiment of the disclosure across 6-6 as shown in FIG. 4.

Detailed reference will now be made to a first potential embodiment of the disclosure, which is illustrated in FIGS. 1 through 6.

The reusable dry erase spray paint can 100 (hereinafter invention) comprises a can 200, a base plug 300, and a color cartridge 400. The invention 100 may spray a dry erase color medium 420 when a nozzle 220 of the can 200 is depressed. The dry erase color medium 420 may be contained in the color cartridge 400. The color cartridge 400 may be replaced when it is empty.

The can 200 comprises a cylindrical wall 205, an end cap 210, a valve 215, and the nozzle 220. The can 200 may be shaped and sized to resemble a spray paint can. The can 200 may be adapted to be held by a user by placing an index finger on top of the nozzle 220 and grasping the cylindrical wall 205 using a thumb on one side of the can 200 and a middle finger, ring finger, and little finger on the other side of the can 200.

The cylindrical wall 205 and the end cap 210 may form a hollow enclosure for the base plug 300 and the color cartridge 400. The top of the cylindrical wall 205 may be coupled to the rim of the end cap 210. The bottom of the can 200 may be open to accept the insertion of the base plug 300 into the can 200. The bottom inside of the can 200 may comprise inside threads 280 to hold the base plug 300 in place.

The end cap 210 may be convex in shape when viewed from outside of the can 200. The valve 215 may be coupled to the bottom center of the end cap 210, on the inside of the can 200. The center of the end cap 210 may comprise a nozzle aperture 225. The nozzle 220 may be inserted into the nozzle aperture 225 from the top side of the end cap 210 by placing a nozzle stem 230 into the nozzle aperture 225. The nozzle stem 230 may pass through the nozzle aperture 225 and may press against the valve 215.

The valve 215 may prevent a pressurized mix 430 of the dry erase color medium 420 and pressurized air from exiting from the interior of the can 200 except when the nozzle 220 is depressed. Depressing the nozzle 220 may activate the valve 215 to release the pressurized mix 430 into the nozzle aperture 225 where it may then flow into the nozzle 220. An internal spring within the valve 215 may force the nozzle 220 up when the nozzle 220 is not being depressed.

The nozzle 220 may be a cylindrical trigger for the invention 100. The nozzle 220 may comprise a right-angle pathway for the pressurized mix 430 to follow from the bottom of the nozzle stem 230 to a pinhole 235 located on the side of the nozzle 220. The nozzle stem 230 may press against the valve 215 when the nozzle 220 is depressed, causing activation of the valve 215.

The base plug 300 comprises a cartridge holder 310, a compressor 320, one or more batteries 335, and an on/off control 355. The base plug 300 may be a cylindrical enclosure for the compressor 320. The base plug 300 may comprise outside threads 305 surrounding the outside bottom of the side of the base plug 300. The outside threads 305 may complement the dimensions and thread size of the inside threads 280 such that the base plug may be retained in the can 200 by screwing the outside threads 305 of the base plug 300 into the inside threads 280 of the can 200. The coupling between the base plug 300 and the can 200 may be airtight.

The cartridge holder 310 may be a collar for holding the color cartridge 400. The cartridge holder 310 may be located on the top, center of the base plug 300. The cartridge holder 310 may hold the color cartridge 400 with the longitudinal axis of the color cartridge 400 oriented vertically. An air aperture 315 located on the top surface of the base plug 300 at the center of the cartridge holder 310 may allow the pressurized air to enter the color cartridge 400.

The compressor 320 may be an air pump that is located inside of the base plug 300. The compressor 320 may comprise an internal electric motor such that when an electrical potential is applied to the compressor 320, the compressor 320 pulls air in at a compressor intake 325 and expels the pressurized air at a compressor outlet 330.

The compressor outlet 330 may be coupled to the air aperture 315 via an output hose 340. The compressor intake 325 may pull the air from outside of the base plug 300. The air may reach the compressor intake 325 by first passing through an inlet 345 into a plenum 350 and from the plenum 350 into the compressor intake 325.

The one or more batteries 335 may comprise one or more energy-storage devices. The one or more batteries 335 may be a source of electrical energy to operate the compressor 320. The one or more batteries 335 may be replaceable or rechargeable. The one or more batteries 335 may be accessed for installation and removal via a battery door 365 located on the bottom of the base plug 300.

The on/off control 355 may enable and disable operation of the compressor 320. In some embodiments, enabling operation may comprise applying power to the compressor 320 and disabling operation may comprise removing power from the compressor 320. In an on position, the on/off control 355 may enable the compressor 320. In an off position, the on/off control 355 may disable the compressor 320.

The color cartridge 400 may comprise a top membrane 405, a bottom membrane 410, or both. The color cartridge 400 may be filled with the dry erase color medium 420 which may be retained within the color cartridge 400 by the top membrane 405 and/or the bottom membrane 410.

The color cartridge 400 may be installed by placing one end of the color cartridge 400 into the cartridge holder 310 and then screwing the base plug 300 into the can 200.

The pressurized air arriving via the air aperture 315 may pressurize the dry erase color medium 420 within the color cartridge 400. The pressurized air may force the dry erase color medium 420 out of the color cartridge 400 where the dry erase color medium 420 and the pressurized air may form the pressurized mix 430. The pressurized mix 430 may exit through the valve 215 when the nozzle 220 is depressed and may be sprayed upon a dry erase surface that the nozzle 220 is pointed at. The top membrane 405 and the bottom membrane 410 may burst due to pressure or may be cut by sharp edges within the can 200 and the cartridge holder 310 that are provided for the purpose of cutting the membranes.

The bottom of the base plug 300 may comprise recessed finger grips 360 to provide a grasping point for rotating the base plug 300 during installation and removal of the base plug 300.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "airtight" may refer to a container or seal that is impermeable to air.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "collar" is a ring like device that is placed around an object.

Within this disclosure, the word "compressor" refers to a pump that is dedicated to compressing a fluid or placing a fluid under pressure. The fluid being compressed may be gaseous or liquid.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, "convex" is used to describe a surface that resembles the exterior surface of a sphere or a portion thereof.

As used herein, the words "couple", "couples", "coupled" or "coupling", refer to connecting, either directly or indirectly, and does not necessarily imply a mechanical connection.

As used in this disclosure, a "door" is a movable or removable barrier that is attached to the wall of a room or the surface of a container for the purpose of allowing or preventing access through an aperture into the room or container.

As used in this disclosure, an "electric motor" is a device that converts electric energy into rotational mechanical energy.

As used herein, the word "hose" is intended to include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, the word "interior" is used as a relational term that implies that an object is located or contained within the boundary of a structure or a space.

As used herein, the word "longitudinal" or "longitudinally" refers to a lengthwise or longest direction.

As used in this disclosure, a "rim" is an outer edge or border that follows along the perimeter of an object.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A reusable dry erase spray paint can comprising:
a can, a base plug, and a color cartridge;
wherein the reusable dry erase spray paint can sprays a dry erase color medium when a nozzle of the can is depressed;
wherein the dry erase color medium is contained in the color cartridge;
wherein the can comprises a cylindrical wall, an end cap, a valve, and the nozzle;
wherein the can is shaped and sized to resemble a spray paint can;
wherein the can is adapted to be held by a user by placing an index finger on top of the nozzle and grasping the cylindrical wall using a thumb on one side of the can and a middle finger, ring finger, and little finger on the other side of the can;
wherein the cylindrical wall and the end cap form a hollow enclosure for the base plug and the color cartridge;
wherein the top of the cylindrical wall is coupled to a rim of the end cap;
wherein the bottom of the can is open to accept the insertion of the base plug into the can;
wherein the bottom inside of the can comprises inside threads to hold the base plug in place;
wherein the end cap is convex in shape when viewed from outside of the can;
wherein the valve is coupled to the bottom center of the end cap, on the inside of the can;
wherein the center of the end cap comprises a nozzle aperture;
wherein the nozzle is inserted into the nozzle aperture from the top side of the end cap by placing a nozzle stem into the nozzle aperture;
wherein the nozzle stem passes through the nozzle aperture and presses against the valve;
wherein the valve prevents a pressurized mix of the dry erase color medium and pressurized air from exiting from the interior of the can except when the nozzle is depressed;
wherein depressing the nozzle activates the valve to release the pressurized mix into the nozzle aperture where it flows into the nozzle;
wherein an internal spring within the valve forces the nozzle up when the nozzle is not being depressed;
wherein the nozzle is a cylindrical trigger for the reusable dry erase spray paint can;
wherein the nozzle comprises a right-angle pathway for the pressurized mix to follow from the bottom of the nozzle stem to a pinhole located on the side of the nozzle;
wherein the nozzle stem presses against the valve when the nozzle is depressed, causing activation of the valve;
wherein the base plug comprises a cartridge holder, a compressor, one or more batteries, and an on/off control;
wherein the base plug is a cylindrical enclosure for the compressor;
wherein the base plug comprises outside threads surrounding the outside bottom of the side of the base plug.

2. The reusable dry erase spray paint can according to claim 1
wherein the outside threads complement the dimensions and thread size of the inside threads such that the base plug is retained in the can by screwing the outside threads of the base plug into the inside threads of the can.

3. The reusable dry erase spray paint can according to claim 2
wherein the coupling between the base plug and the can is airtight.

4. The reusable dry erase spray paint can according to claim 3 wherein the cartridge holder is a collar for holding the color cartridge;
wherein the cartridge holder is located on the top, center of the base plug;
wherein the cartridge holder holds the color cartridge with the longitudinal axis of the color cartridge oriented vertically;
wherein an air aperture located on the top surface of the base plug at the center of the cartridge holder allows the pressurized air to enter the color cartridge.

5. The reusable dry erase spray paint can according to claim 4
wherein the compressor is an air pump that is located inside of the base plug;
wherein the compressor comprises an internal electric motor such that when an electrical potential is applied to the compressor, the compressor pulls air in at a compressor intake and expels the pressurized air at a compressor outlet.

6. The reusable dry erase spray paint can according to claim 5
wherein the compressor outlet is coupled to the air aperture via an output hose;
wherein the compressor intake pulls the air from outside of the base plug.

7. The reusable dry erase spray paint can according to claim 6
wherein the air reaches the compressor intake by passing through an inlet into a plenum and by passing from the plenum into the compressor intake.

8. The reusable dry erase spray paint can according to claim 7
wherein the one or more batteries comprise one or more energy-storage devices;
wherein the one or more batteries are a source of electrical energy to operate the compressor;
wherein the one or more batteries are replaceable or rechargeable.

9. The reusable dry erase spray paint can according to claim 8
wherein the on/off control enables and disables operation of the compressor;
wherein in an on position, the on/off control enables the compressor;
wherein in an off position, the on/off control disables the compressor.

10. The reusable dry erase spray paint can according to claim 9
wherein the color cartridge comprises a top membrane, a bottom membrane, or both;
wherein the color cartridge is filled with the dry erase color medium which is retained within the color cartridge by the top membrane and/or the bottom membrane.

11. The reusable dry erase spray paint can according to claim 10
wherein the color cartridge is installed by placing one end of the color cartridge into the cartridge holder and then screwing the base plug into the can.

12. The reusable dry erase spray paint can according to claim 11
wherein the pressurized air arriving via the air aperture pressurizes the dry erase color medium within the color cartridge;
wherein the pressurized air forces the dry erase color medium out of the color cartridge where the dry erase color medium and the pressurized air form the pressurized mix;
wherein the pressurized mix exits through the valve when the nozzle is depressed and is sprayed upon a dry erase surface that the nozzle is pointed at.

13. The reusable dry erase spray paint can according to claim 12 wherein the bottom of the base plug comprises recessed finger grips to provide a grasping point for rotating the base plug during installation and removal of the base plug.

* * * * *